United States Patent [19]

Carew et al.

[11] Patent Number: 5,058,153
[45] Date of Patent: Oct. 15, 1991

[54] NOISE MITIGATION AND MODE SWITCHING IN COMMUNICATIONS TERMINALS SUCH AS TELEPHONES

[76] Inventors: Edward C. Carew, R.R. 1, Carleton Place, Ont., Canada, K1Y 3P1; Roland T. Lockhart, 307-1300 Richmond, Ottawa, Canada, K2B 8L2; Sean G. Brophy, 988 Memorial Dr., Apt. 688, Cambridge, Mass. 02138

[21] Appl. No.: 457,345

[22] Filed: Dec. 27, 1989

[51] Int. Cl.⁵ .............................................. H04M 9/08
[52] U.S. Cl. ..................................... 379/390; 379/388; 379/389
[58] Field of Search ........................ 379/388, 389, 390

[56] References Cited

U.S. PATENT DOCUMENTS

| | | | |
|---|---|---|---|
| 3,751,602 | 8/1973 | Breeden | 379/389 |
| 3,894,187 | 7/1975 | Shibata et al. | 379/390 |
| 3,925,618 | 12/1975 | Kato et al. | 379/389 |
| 3,952,166 | 4/1976 | Kato et al. | 379/389 |
| 4,513,177 | 4/1985 | Nishino et al. | 379/389 |
| 4,571,461 | 2/1986 | Uno et al. | 379/390 |
| 4,715,063 | 12/1987 | Haddad et al. | 379/388 |
| 4,796,287 | 1/1989 | Reesor et al. | 379/390 |

Primary Examiner—Jin F. Ng
Assistant Examiner—Jhancy Augustus
Attorney, Agent, or Firm—Lerner, David, Littenberg, Krumholz & Mentlik

[57] ABSTRACT

A circuit to improve noise mitigation and mode switching in telephony, wherein the noise-floor level is continuously estimated by comparing its stored current value to the signal level value and substituting the latter for the former if it is less than the former.

10 Claims, 2 Drawing Sheets

NOISE MITIGATION AND MODE SWITCHING IN COMMUNICATIONS TERMINALS SUCH AS TELEPHONES

BACKGROUND OF THE INVENTION

1. Field of the Invention

The present invention relates to full duplex communications terminals in general, and to the mitigation of ambient noise in such terminals in particular. More particularly still, it relates to mode or state control in handsfree or loudspeaking communications terminals in telephony but is not restricted thereto. For example, the invention is equally applicable to handset operation (as opposed to handsfree operation).

2. Prior Art of the Invention

The most basic loudspeaking communications terminal would employ two voice switched states: full receive or full transmit. A third quiescent or idle state would overcome the "dead" sensation to the far-end user at the remote terminal during speech inactivity, and reduces the degree of switching required between receive and remote terminal during speech inactivity, and reduces the degree of switching required between receive and transmit states, which improves performance subjectively.

For example, U.S. Pat. No. 3,889,059, issued June 10, 1975, to Thompson et al, discloses a speakerphone apparatus which has transmit and receive channels and also includes a control means for alternately operating the apparatus in transmitting and receiving modes. The gain in the transmitting mode is regulated in inverse relation to substantially monotonous amplitude sound, as distinct from voice-like impulse amplitude sound. The natural tendency of a user to speak more loudly in a noisy environment characterized by the presence of monotonous ambient sound, is thereby compensated for and a more constant speech signal level is presented to the transmission facility. In a voice controlled speakerphone embodiment there is also an idle mode of operation in which the gain in the transmit channel is likewise regulated by the amount of substantially monotonous ambient room noise.

The ambient noise determination in the above patent is described as follows:

"In operation, the noise circuit in FIG. 2 provides the ambient noise voltage and current signals. The circuit responds very slowly to positive going signals and very rapidly to negative going signals so that at the output of the differential amplifier 35 a signal appears which is substantially related to the ambient noise in the operating environment of the apparatus. Here and in the remainder of the disclosure "noise" is taken to mean signals of a monotonous or generally steady nature as compared with typical speech envelope signals, which are well known to have an irregular impulse envelope characteristic. The output signal is substantially unaffected by speech content in the signal from the microphone signal rectifier 14. The transistor 38 operates as an emitter follower. The signal from the output of the differential amplifier 35 is connected to the base of the transistor 38 via the resistor 37 and hence a corresponding voltage signal appears at the emitter electrode of the transistor 38. This signal or noise voltage develops a linearly related current through the resistor 39, which then is available as a noise current at the collector electrode of the transistor 38."

In U.S. Pat. No. 4,555,596, issued Nov. 26, 1985, to Blomley, either the transmitting or the receiving speech channel is disabled:

"To do this, the signal from each channel is applied to an analogue-digital signal envelope converter (30,31), which generates a multi-bit word representative of the current speech amplitude in its channel. Those words are applied to a comparator (32) whose output is indicative of which channel passes speech. Such a converter follows the envelope of the speech signal in its channel to produce the multi-bit word representing the current speech amplitude in its channel. The comparator's output goes via control logic (33) to two attenuators (34,35), one in each channel. Thus only the channel which is actually passing speech, or the one with the higher speech amplitude, is enabled."

SUMMARY OF THE INVENTION

Like some prior devices, the present invention provides three-state voice switching employing two variolossers, one for the receive direction and one for the transmit direction, which are operated as complementary ganged attenuators. As in any switched handsfree operation, the device of the present invention is required to allocate the active voice channel to one party based on the most recent information derived from the talk activity of both parties to the connection.

In the present invention signal magnitude envelopes are detected for three signals: the received speech or voice signal from the far end; the transmitted speech signal at the near end; and the raw microphone speech signal at the near end. Each of the three signals is rectified with fast attack and slow decay tracking. Digital representations of the three envelopes are stored in three associated registers for access by a processor.

An important aspect of the present invention is the determination or estimation of the noise conditions, be they the result of line noise, room noise, or both. In order to accomplish this, the most recent speech signal envelope data, above-mentioned, is used. Advantage is taken of the pauses in the transmitted or received voice signals, which allow the signal envelope detectors to deplete, i.e. to decay to the noise-floor. In other words, the valleys in the signal envelope are detected by comparing the current estimate of noise-floor level with the most recently acquired signal level. If the value of the signal level is less than the current noise-floor level estimate, the new value of the noise-floor level estimate is made equal to the signal level. However, in order to eliminate instances where the signal level is very low and is in fact below the actual noise-floor level, the noise-floor level estimate is incremented periodically by a small amount in order to enable it (the noise-floor level estimate) to remain sufficiently close to the real noise-floor level.

An additional advantage of the present invention is improved subjective performance to the remote listener when high ambient noise causes the talker to raise his/her voice.

Furthermore, for handset operation, the voice switching would be set at a relatively low depth, say 10 dB. As such, users may not perceive the switching between receive and transmit, while general performance is improved, for example, due to a lower sidetone level, and inhibition of "howling" when the handset is placed facedown on a hard surface.

Thus, according to a broad aspect of the present invention a circuit for controlling a telecommunications terminal between three states: a transmit state, a receive state, and a quiescent state, wherein voice signals are transmitted and received to and from a remote terminal, comprising: an acousto-electric transducer providing signals for transmission to the remote terminal through a transmit variolosser; an electro-accoustic transducer providing audible signals received from the remote terminal through a receive variolosser; envelope detection means at the input of the transmit variolosser providing a microphone signal value; storage means registering a current noise signal value; and means for substituting the microphone signal value into said storage means in response to a comparison between the microphone signal value and the current noise signal value, whereby the microphone signal value becomes a new current noise signal value.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

Figure 1:
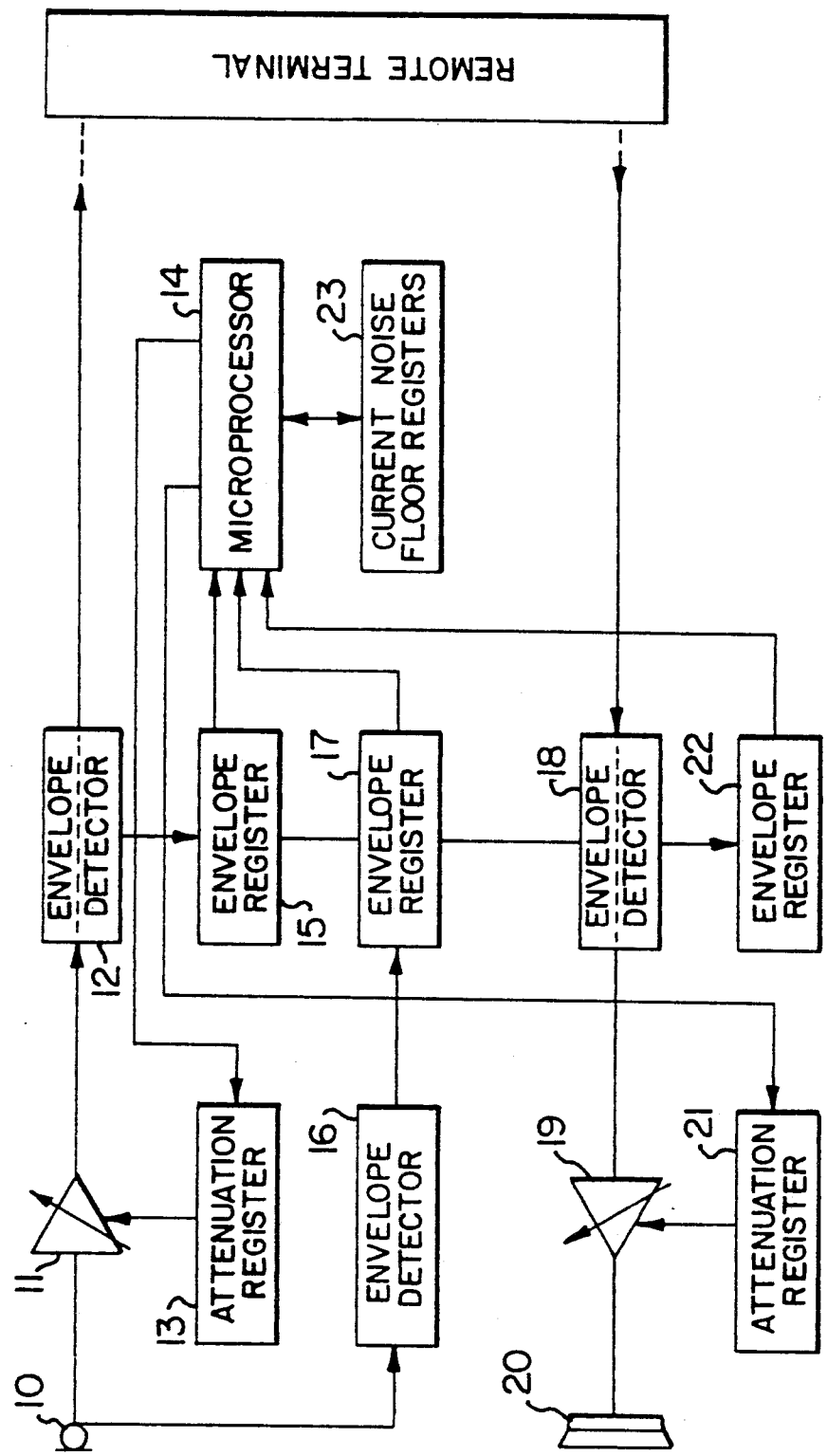
FIG. 1 is a block schematic of the circuit according to the present invention.

The circuit of FIG. 1 shows schematically a microphone 10 connected to a transmit amplifier/variolosser 11 (hereinafter variolosser 11), at the output of which an envelope detector 12 is connected and which supplies the transmitted voice signal of the user to the far end remote communications terminal. The gain of the variolosser 11 is determined by digital value stored in attenuation register 13, which is written by microprocessor 14. The transmit signal envelope level detected by the envelope detector 12 is stored in envelope register 15, which is read by the microprocessor 14. In addition, still in the transmit side of the circuit in FIG. 1, the raw microphone signal envelope is detected in envelope detector 16, and the detected level is stored in envelope register 17, which is also read by the microprocessor 14. On the receive side, the voice signal received from the remote communications terminal is envelope detected in detector 18 and applied to a receive amplifier/variolosser 19 (hereinafter variolosser 19), which drives electroacoustic transducer 20, the latter being a loudspeaker in case of a handsfree communications terminal, or simply the receiver in a standard telephone handset. The gain of the variolosser 19 is determined by the digital value stored in attenuator register 21, which is written by the microprocessor 14. The envelope level detected in the detector 18 is stored in envelope register 22, which is also read by the microprocessor 14. Finally, the microprocessor 14 reads and writes (updates) microphone and receive noise-floor values stored in current noise-floor level registers 23.

Figure 2:
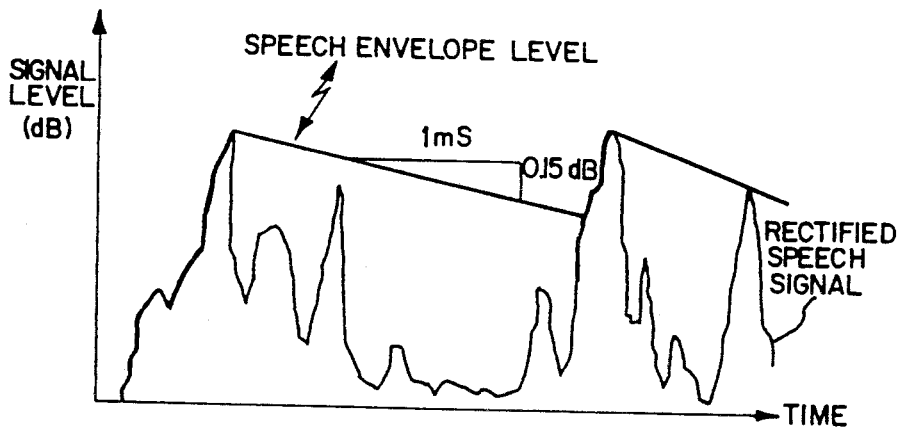
FIG. 2 is an illustration of signal envelope detection employed in the circuit of FIG. 1.

The three envelope detectors 12, 16 and 18, rectify the respective signal with a fast attack and slow decay tracking. This is illustrated in FIG. 2, where the decay rate is indicated to be 0.15 dB/ms. A suitable attack rate would be in the vicinity of 6 dB/ms. These, of course, are approximate rates and would depend on design choices. While such rectifying envelope detectors are generally known in the art, a preferred implementation of the envelope detectors 12, 16 and 18 will be discussed later on in conjuction with FIG. 4 of the drawings.

Figure 3:
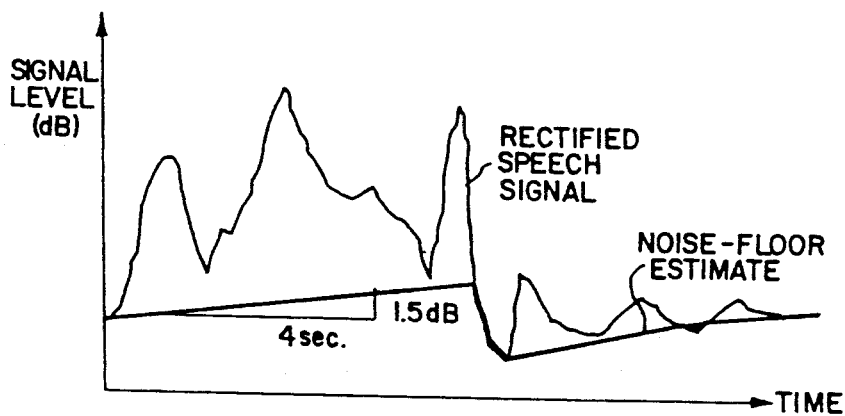
FIG. 3 is an illustration of noise-floor determination employed in the circuit of FIG. 1.

In the preferred embodiment, two noise-floor levels are detected and continuously updated and stored as current values in registers 23. The first noise level detected is that at the input of the transmit variolosser 11 which is the output signal of the microphone 10; the second is that at the input of the receive variolosser 19. Thus the only data available to determine the transmit and receive noise-floors is the respective speech signal envelope information that has just been read by the microprocessor 14 from the registers 17 and 22. These values, of course, are the result of rectification and filtering of the respective voice signals with a fast attack and slow decay envelope follower. In order to detect the pauses in the speech signal, the current estimate of the respective noise-floor value stored in the registers 23 is compared with the most recently read value, and if the latter is less than the current value stored in the registers 23, then the registers are updated to store the value just read. Otherwise, the registers 23 remain unaltered. However, in order to ensure that a continuously reasonable estimate of the noise-floor level is stored in the registers 23, the values in the registers 23 are incremented periodically to avoid the problems of very low signal levels that may fall below the actual noise-floor. It was found experimentally that a good performance is achieved by incrementing the noise-floor estimates stored in the registers 23 by 1.5 dB every four seconds. This is illustrated in FIG. 3 of the drawings. This approach ensures that the current noise-floor estimates stored in the registers 23 remain within reasonable bounds of the actual noise levels.

The software necessary for updating the registers 23 by the microprocessor 14 is relatively simple. By way of example, the following pseudo code is given for updating the register storing the current noise-floor level estimate at the output of the microphone 10:

```
IF MIC-LEVEL LESS THAN MIC-NOISE THEN
    MIC-NOISE = MIC-LEVEL
    RESTART MIC-NOISE-TIMER
ELSEIF MIC-LEVEL = MIC-NOISE THEN
    RESTART MIC-NOISE-TIMER
ELSE (MIC-LEVEL LARGER THAN MIC-NOISE)
    INCREMENT MIC-NOISE-TIMER
    IF MIC-NOISE-TIMER = 4 SECONDS THEN
        MIC-NOISE = MIC-NOISE + 1
        RESTART MIC-NOISE-TIMER
    ENDIF
ENDIF
```

For the receive noise level, substitute RECEIVE for MIC in the above code. The receive noise level is used to increase receive loss of the variolosser 19 to mitigate excessive receive noise on the line.

In the above pseudo code, MIC-LEVEL is the value just read by the microprocessor 14 from the register 17, the MIC-NOISE is the value stored in the registers 23. The MIC-NOISE-TIMER is simply a timing counter incremented by the microprocessor 14. The digit 1 added to the MIC-NOISE adds 1.5 dB to the current noise estimate (3 dB being equal to doubling of noise power).

The MIC-NOISE value is used to reduce the gain of the transmit variolosser 11 being 0.5 dB for every 1 dB increase in MIC-NOISE above a predetermined threshold. The half-for-one reduction in transmit gain, as well the threshold of 43 dBA, were determined experimentally. This gain compensation is based on the fact that most talkers speak louder as the ambient (room) noise rises beyond a certain level. By reducing the transmit gain, therefore, the subjective impairment of the loud noise will be less noticeable at the remote terminal. The gain reduction also reduces the variolosser setting change when the terminal changes from transmit to receive mode. An example pseudo code for this transmit gain reduction, which determines the variolosser 11 attenuation written in the register 13 by the microprocessor 14, is as follows:

```
IF MIC-NOISE LESS THAN MIC-NOISE-THRESHOLD
    THEN TOLR-DELTA=0
ELSE (MIC-NOISE EQUAL OR MORE THAN MIC-NOISE-
THRESHOLD)
    TOLR-DELTA=(MIC-NOISE MINUS MIC-NOISE-
THRESHOLD/2)
ENDIF
```

TOLR-DELTA is the differential reduction in gain deducted from the value stored in the attenuation register 13 which controls the variolosser 11.

Figure 4:
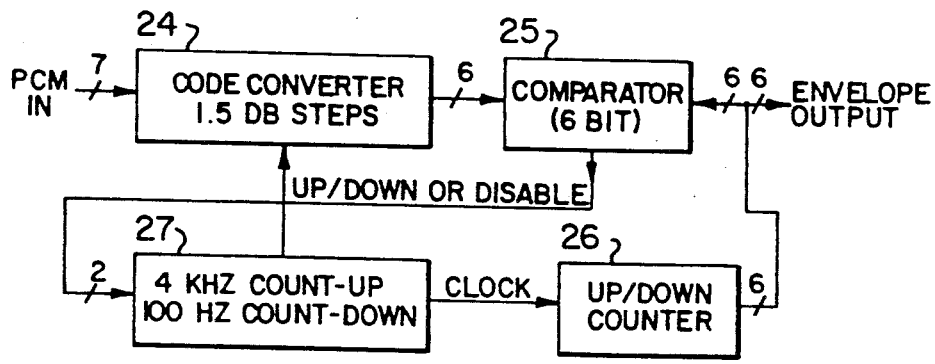
FIG. 4 is a block schematic of the circuit of the envelope detector shown in FIG. 1.

Referring now to FIG. 4 of the drawings, the preferred implementation of the envelope detectors 12, 16 and 18 will be described. At the outset it should be noted that while in the circuit shown in FIG. 1, the microphone 10 is shown without specifying the nature of its output signal applied to the inputs of the variolosser 11 and the envelope detector 16, the preferred mode of implementation is that such output signal is a PCM signal. In other words, the output of the actual analog microphone has been analog-to-digital converted to a PCM signal before processing by the circuit shown in FIG. 1. Hence, now referring to FIG. 4, an input 7-bit PCM signal is applied to a code converter 24 which converts the incoming PCM into a 6-bit magnitude code graduated into 1.5 dB steps, which is applied to one side of a 6-bit comparator 25. The comparator 25 compares the current 6-bit word to a previously stored 6-bit word supplied from an up/down counter 26, which is clocked to count up at the rate of 4 kHZ or down at the rate of 100 HZ by means of clock source 27, which is in turn controlled by the output of the comparator 25. The 4 kHZ clock also clocks the code converter 24 continuously. The circuit operates as follows.

If the 6-bit sample supplied by the code converter 24 is greater than the 6-bit word in the counter 26, then the output of the comparator 25 causes the counter 26 to count-up at the 4 kHZ clock rate. This effectively achieves an attack rate equal to the step of 1.5 dB divided by the period of the 4 kHZ clock, that is an attack rate of 6 dB/ms. If on the other hand the new 6-bit code word supplied by the converter 24 is less than the word in the counter 26, then the comparator would cause the counter 26 to count down by the 100 HZ clock. This effectively achieves a decay rate equal to 1.5 dB divided by the period of the 100 hz clock, which is equal to 0.15 dB/ms. If the values compared in the comparator 25 are equal, then the counter 26 is not clocked and retains its value. Hence, the output of the up/down counter 26 represents the detected envelope of the input PCM signal at the attack and decay rates desired.

The circuit shown in FIG. 4 may of course be used in triplicate, one for each of the envelope detectors 12, 16 and 18. However, it is more opportune to time share the circuit between the three detectors by placing suitable multiplexers under control of the microprocessor 14, and to only have the counter 26 in triplicate.

In operation the microprocessor 14 compares the various data read by it from the envelope registers 15, 17 and 22 as well as the current noise-floor registers 23 and writes the attenuation registers 13 and 21, which in turn control transmit and receive varioloosers 11 and 19, respectively. The microprocessor 14, therefore, determines the momentary state of the circuit in accordance with the following table.

| SIGNAL PRESENCE | CURRENT STATE | | |
|---|---|---|---|
| | TRANSMIT | QUIESCENT | RECEIVE |
| NO TRANSMIT SIGNAL NO RECEIVE SIGNAL | GO TO QUIESCENT | STAY IN QUIESCENT | GO TO QUIESCENT |
| YES TRANSMIT SIGNAL NO RECEIVE SIGNAL | STAY IN TRANSMIT | IF TRANSMIT-LEVEL GREATER THAN RECEIVE LEVEL THEN GO TO TRANSMIT ELSE STAY IN QUIESCENT | GO TO QUIESCENT |
| NO TRANSMIT SIGNAL YES RECEIVE SIGNAL | GO TO QUIESCENT | IF RECEIVE-LEVEL GREATER THAN TRANSMIT-LEVEL THEN GO TO RECEIVE ELSE STAY IN QUIESCENT | STAY IN RECEIVE |
| YES TRANSMIT SIGNAL YES RECEIVE SIGNAL | IF RECEIVE-LEVEL GREATER THAN TRANSMIT-LEVEL 4.5 dB THEN GO TO RECEIVE ELSE STAY IN TRANSMIT | IF TRANSMIT-LEVEL GREATER THAN RECEIVE-LEVEL THEN GO TO TRANSMIT ELSE IF TRANSMIT-LEVEL LESS THAN RECEIVE-LEVEL THEN GO TO RECEIVE ELSE STAY IN | IF TRANSMIT-LEVEL GREATER THAN RECEIVE-LEVEL + LOW-LEVEL-BOOST THEN GO TO TRANSMIT ELSE STAY IN RECEIVE |

| SIGNAL PRESENCE | CURRENT STATE | | |
|---|---|---|---|
| | TRANSMIT | QUIESCENT | RECEIVE |
| | | QUIESCENT | |

-continued

In the above table, the LOW-LEVEL-BOOST is a hysteresis factor of a few dB, which provides a basis in favour of staying in the receive mode when this mode is first entered.

We claim:

1. A circuit for controlling a telecommunications terminal between three states: a transmit state, a receive state, and a quiescent state, wherein voice signals are transmitted and received to and from a remote terminal, comprising;
   an acousto-electric transducer providing signals for transmission to said remote terminal through a transmit variolosser;
   an electro-acoustic transducer providing audible signals received from said remote terminal through a receive variolosser;
   first envelope detection means for detecting the signals from said acousto-electric transducer for providing a microphone signal value;
   second envelope detection means at the output of said transmit variolosser;
   storage means registering a current noise signal value; and
   means for substituting said microphone signal value into said storage means in response to a comparison indicating said microphone signal value being less than said current noise signal value, whereby said microphone signal value becomes a new, lower, current noise signal value.

2. The circuit for controlling a telecommunications terminal as defined in claim 1, further comprising third envelope detection means at the input of a receive variolosser for varying path gain of received voice signals.

3. The circuit for controlling a telecommunications terminal as defined in claim 2, further comprising microprocessor means for controlling said transmit and receive variolossers.

4. The circuit for controlling a telecommunications terminal as defined in claim 3, further comprising program means in said microprocessor for comparing said microphone signal value to said current noise signal value to decide if the former is less than the latter.

5. The circuit for controlling a telecommunications terminal as defined in claim 4, further comprising program means in said microprocessor for periodically incrementing said current noise signal value by a predetermined amount.

6. The circuit for controlling a telecommunications terminal as defined in claim 5, wherein the periodical incrementing of the current noise signal value occurs every few seconds by an amount of a few decibels.

7. The circuit for controlling a telecommunications terminal as defined in claim 6, wherein said few seconds is less than ten seconds.

8. The circuit for controlling a telecommunications terminal as defined in claim 6, wherein said few decibels is less than five decibels.

9. The circuit for controlling a telecommunications terminal as defined in claim 6, wherein said few seconds is less than ten seconds, and said few decibels is less than five decibels.

10. The circuit for controlling a telecommunications terminal as defined in claim 9, wherein said few seconds is one to six seconds, and said few decibels is one-half to two decibels.

* * * * *

UNITED STATES PATENT AND TRADEMARK OFFICE
CERTIFICATE OF CORRECTION

PATENT NO.  : 5,058,153

DATED       : October 15, 1991

INVENTOR(S) : Carew et al

It is certified that error appears in the above-identified patent and that said Letters Patent is hereby corrected as shown below:

Columns 5 and 6 in the table labeled CURRENT STATE, under the TRANSMIT column and after the words "GREATER THAN TRANSMIT-LEVEL," insert therefor -- + --.

Signed and Sealed this

Thirtieth Day of March, 1993

Attest:

STEPHEN G. KUNIN

*Attesting Officer*    *Acting Commissioner of Patents and Trademarks*